United States Patent
Iehisa et al.

(10) Patent No.: US 6,555,784 B2
(45) Date of Patent: Apr. 29, 2003

(54) LASER MACHINING APPARATUS

(75) Inventors: Nobuaki Iehisa, Mishima (JP); Norio Karube, Machida (JP); Akihiro Terada, Fujiyoshida (JP); Atsushi Watanabe, Tokyo (JP); Mitsuhiro Okuda, Yamanashi (JP)

(73) Assignee: Fanuc Ltd., Yamanashi (JP)

(*) Notice: Subject to any disclaimer, the term of this patent is extended or adjusted under 35 U.S.C. 154(b) by 10 days.

(21) Appl. No.: 09/832,206

(22) Filed: Apr. 11, 2001

(65) Prior Publication Data

US 2001/0042737 A1 Nov. 22, 2001

(30) Foreign Application Priority Data

Apr. 11, 2000 (JP) ........................................ 2000-109636

(51) Int. Cl.$^7$ .............................................. B23K 26/36
(52) U.S. Cl. ................................................. 219/121.76
(58) Field of Search ........................ 219/121.6, 121.63, 219/121.65, 121.67, 121.7, 121.76, 121.77

(56) References Cited

U.S. PATENT DOCUMENTS

| | | | | |
|---|---|---|---|---|
| 4,820,899 A | * | 4/1989 | Hikima et al. | 219/121.76 |
| 5,272,309 A | * | 12/1993 | Goruganthu et al. | 219/121.63 |
| 5,430,816 A | * | 7/1995 | Furuya et al. | 219/121.6 |
| 5,580,471 A | * | 12/1996 | Fukumoto et al. | 219/121.63 |

FOREIGN PATENT DOCUMENTS

EP      308 512     3/1989

OTHER PUBLICATIONS

Koyanagi Tetsuya, Patent Abstracts of Japan, Laser Beam Machine, Publication No.: 10156571, Publication Date: Jun. 16, 1998.

Shigeta Tatsuo, Patent Abstracts of Japan, Plate Making Apparatus, Publication No.: 10305551, Publication Date: Nov. 17,1998.

Alborante Gianarlo, Patent Abstracts of Japan, Device For Laser Welding Motor–Vehicle Body, Publication No.: 4238689, Publication Date: Aug. 26, 1992.

* cited by examiner

Primary Examiner—Samuel M. Heinrich
(74) Attorney, Agent, or Firm—Staas & Halsey LLP

(57) ABSTRACT

A laser machining apparatus with a simplified laser beam transmitting network. Respective laser beams form laser generators LS#11 to LS#25 divided into groups of G1 and G2 are aggregated to fiber-optic cables H1 and H2 by confluence devices HC1 and HC2 and transmitted to a most upstream laser beam outlet OP1. The laser beams are further aggregated to a fiber-optic cable H3 and distributed to a branch fiber-optic cable HH1 by the laser beam outlet OP1, and then distributed by laser beam outlet OP2 to OP8 to branch fiber-optic cables HH2 to HH8. The laser beams distributed to branch fiber-optic cables are focused by the machining tools TL1 to TL8 attached to robots RB1 to RB8 for laser machining. By controlling output levels of the laser generators with different oscillation wavelengths and different polarization characteristics, blend ratio of the laser beams can be adjusted. Distribution ratios of the laser beams at the laser beam outlets OP1 to OP8 are adjustable.

7 Claims, 7 Drawing Sheets

LASER MACHINING APPARATUS

BACKGROUND OF THE INVENTION

1. Field of the Invention

The present invention relates to a laser machining apparatus for performing laser machining of welding, cutting, etc. by applying laser beams on a workpiece from machining tools, which is suitable for use in a motor vehicle manufacturing line.

2. Description of the Related Art

Recently, the laser welding using a YAG laser as an optical energy supply source has increasingly been adopted especially on a motor vehicle manufacturing line. The reason for this is that the laser welding has an advantage of achieving high rigidity and lightweight easily in terms of vehicle body design over the spot welding.

Regarding the positioning of a machining tool that applies a laser beam on a workpiece, the use of a special positioning device and a robot capable of programing a travel path has already been proposed. Also, an example in which a line configuration such that a plurality of laser generators are prepared, and laser beams are supplied to a plurality of locations where welding is performed employing an optical distribution system is considered (Japanese Patent Laid-Open Publication No. 4-238689) has been reported.

However, in the case where the system is used in the manufacturing line of the motor vehicles, the laser machining apparatus in which networks of the fiber-optic cables is simplified for effectively supplying a laser output to the manufacturing line is not yet provided.

SUMMARY OF THE INVENTION

A primary object of the present invention is to provide a laser machining apparatus capable of providing laser beams in a manufacturing line of the motor vehicles by simplifying a network of fiber-optic cables.

The laser machining apparatus of the present invention comprises: a plurality of laser generators; a plurality machining tools for focusing laser beams; machining tool moving means for respectively moving the machining tools along predetermined paths; fiber-optic cables forming optical transmission paths for guiding the laser beams outputted from the laser generators to the machining tools; laser beam confluence means intervened in the optical transmission paths to join at least part of laser beams outputted from the laser generators to be confluent into a fiber-optic cable or fiber-optic cables of the number smaller than that of the laser generators; and laser beam distribution means intervened in the optical transmission paths to distribute the confluent laser beam to a plurality of laser beam outlets. The laser beam distributed to the laser beam outlet is focused at the machining tool for performing machining.

The laser generators may be divided into a plurality of groups, and at least part of the laser beams outputted from the laser generators in each group are joined to be confluent into a fiber-optic cable or fiber-optic cables of the number smaller than that of the laser generators in the group by the laser beam confluence means and the confluent laser beam in each group is distributed to the plurality of laser beam outlets by the laser beam distribution means.

The laser beam confluent means may be constituted using a laser beam superposing optical element for joining the laser beams utilizing at least one of a difference of polarizing directions and a difference of wavelengths of the laser beams.

It is preferable that the output levels of the respective laser generators are adjustable in accordance with the sum of laser beam outputs required by the respective machining tools. Further, it is preferable that a speed of the laser machining is varied in accordance with the laser beam outputs distributed to the laser beam outlets by the machining tool moving means.

DETAILED DESCRIPTION OF THE PREFERRED EMBODIMENTS

Figure 1:
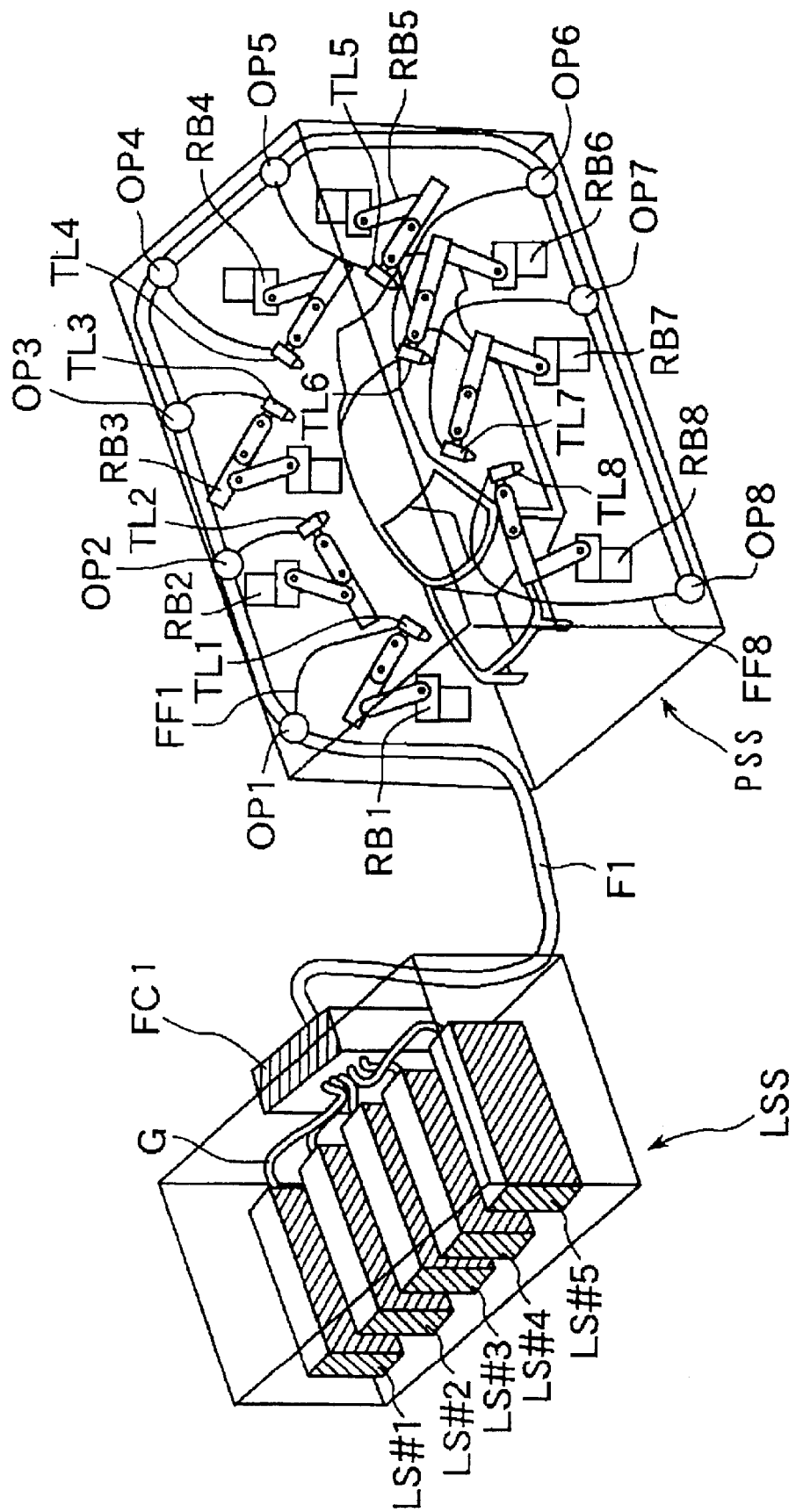
FIG. 1 is a schematic perspective view showing a laser machining system according to one embodiment of the present invention.

FIG. 1 shows a laser machining apparatus according to one embodiment of the present invention. As shown in FIG. 1, a laser machining apparatus according to this embodiment comprises five laser generators LS#1 to LS#5, eight machining tools TL1 to TL8 respectively focusing laser beams provided by the laser generators for performing laser machining and eight robots RB1 to RB8 for respectively moving the machining tools TL1 to TL8 along predetermined paths and a laser beam confluence device FC1.

As the laser generator, what is called a YAG laser oscillator is used, and in some cases, another type of YAG laser oscillator can be used. Also, oscillation wavelengths, polarization characteristics and maximum outputs of the laser generators LS#1 to LS#5 may be the same or different from one another (see an example of FIG. 3 described later).

The robots RB1 to RB8 are ordinary ones that are controlled by a robot controller (not shown in FIG. 1, see FIG. 6 described later) connected to each of the robots. Each of the robots moves the machining tool TL1 to TL8 along a desired path in accordance with a machining program taught to each robot. The machining program data includes not only a command for movement but also commands for start and end of machining, the specification and change of type of machining operation, etc. and related parameters.

The machining tool TL1 to TL8 performs machining operations using a laser beam at required machining locations on a workpiece W. The types of machining operation include welding, cutting, and so on. The workpiece W is typically a vehicle body positioned on a manufacturing line. It is a matter of course that other workpiece W is machined according to the application.

The machining tools TL1 to TL8 and the robots RB1 to RB8, which are moving means therefor, are arranged around the workpiece W. The place where these elements are arranged is hereafter referred to as a machining station PSS.

On the other hand, the laser generators LS#1 to LS#5, which are supply sources for supplying laser beams to the machining tools TL1 to TL8, are disposed in a place separate from the machining station PSS. The place where the laser generators are disposed is hereafter referred to as a laser station LSS. Laser beams from the laser generators LS#1 to LS#5 disposed in the laser station PSS is transmitted to the laser beam confluence device FC1 through a short fiber-optic cable G. A fiber-optic cable (bus cable) F1 is connected to an output of the confluence device FC1 and the output beams of the laser generators LS#1 to LS#5 are aggregately transmitted to the machining station PSS by the fiber-optic cable F1.

Further, laser beam outlets OP1 to OP8 are provided at appropriate positions in the fiber-optic cable F1. Each of the laser beam outlets OP1 to OP8 distributes and provides the laser beam to the machining tools TL1 to TL8 through branch fiber-optic cables FF1 to FF8.

In place of the arrangement shown in FIG. 1, a plurality of laser generators may be divided into two or more groups. In this case, a laser beam confluence device and a fiber-optic cable (sub-bus cable) are provided for each group and the fiber-optic cables are joined together to one fiber-optic cable (bus cable). The bus fiber-optic cable has necessary number of laser beam outlets (corresponding to the number of machining tools) for distributing and providing laser beams to respective machining tools through branch cables.

Figure 2:
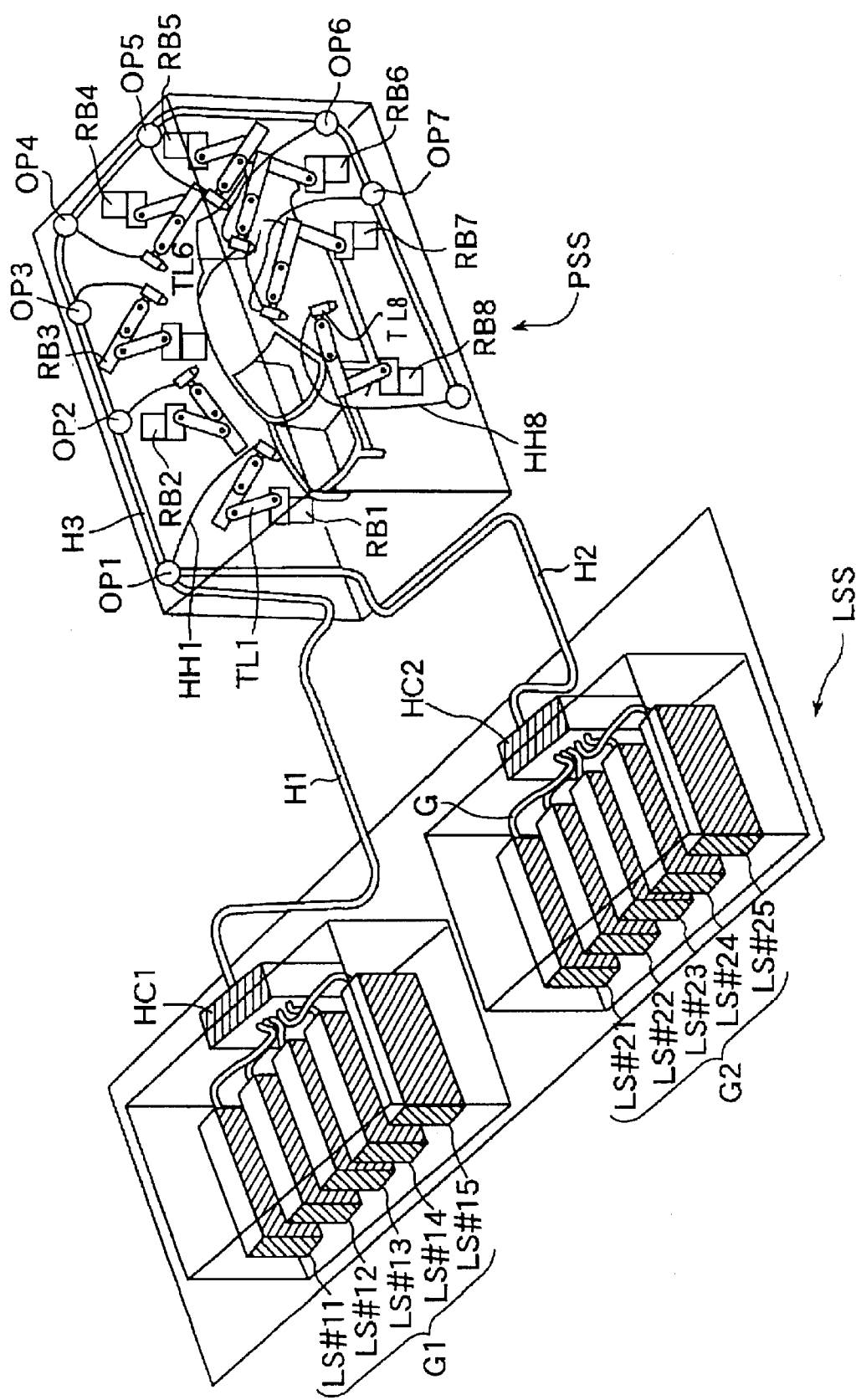
FIG. 2 is a schematic perspective view showing a laser machining system according to another embodiment of the present invention.

FIG. 2 shows an embodiment in which laser generators are grouped. In FIG. 2, the same reference numerals are used for the same or equivalent elements as in FIG. 1. Referring to FIG. 2, the laser machining apparatus comprises ten laser generators LS#11 to LS#15 and LS#21 to LS#25, eight machining tools TL1 to TL8 for focusing the laser beam for performing laser machining at machining station PSS, robots RB1 to RB8 for moving respective machining tools and laser beam confluence devices HC1 and HC2.

As in the first embodiment shown in FIG. 1, a YAG laser oscillator is used as the laser generator, and in some cases another type of YAG laser oscillator can be used. Also, oscillation wavelengths, polarization characteristics and maximum outputs of the laser generators LS#11 to LS#15 and LS#21 to LS#25 may be the same or different from one another.

The robots RB1 to RB8 are ordinary ones that are controlled by a robot controller (not shown in FIG. 2, see FIG. 6 described later) connected to each of the robots. Each of the robots moves the machining tool TL1 to TL8 along a desired path in accordance with a machining program taught to each robot. The machining program data includes not only a command for movement but also commands for start and end of machining, the designation/change of machining speed, etc. and related parameters.

The machining tool TL1 to TL8 performs machining operations using a laser beam at required machining locations on a workpiece W. The types of machining operation include welding, cutting, and so on. The workpiece W is typically a vehicle body positioned on a manufacturing line. It is a matter of course that other workpiece W is machined according to the application.

The ten laser generators are divided into two groups of a first group G1 of laser generators LS#11 to LS#15 and a second group G2 of laser generators L#21 to LS#25. Oscillation wavelengths, polarization characteristics and maximum outputs of the laser generators may be the same or different from one another.

Respective outputs of the laser generators LS#11 to LS#15 of the first group G1 are guided to the laser beam confluence device HC1, and respective outputs of the laser generators LS#21 to LS#25 of the second group G2 are guided to the laser beam confluence device HC2.

A single fiber-optic cable (sub-bus cable) H1 is connected to an output of the confluence device FC1 and another single fiber-optic cable (sub-bus cable) H2 is connected to an output of the confluence device FC2.

Output beams of the fiber-optic cables H1 and H2 are transmitted to another fiber-optic cable (bus cable) H3 through another laser beam confluence device. In this embodiment shown in FIG. 2, a laser outlet OP1 located in the most upstream in the optical path functions as the laser beam confluence device.

There are provided eight laser outlets including the most upstream outlet OP1. Respective laser outlets OP1 to OP8 distribute and provide laser beams to the respective machining tools TL1 to TL8 through the branch fiber-optic cables HH1 to HH8 (reference numerals HH2–HH7 are omitted in FIG. 2).

Figure 3:
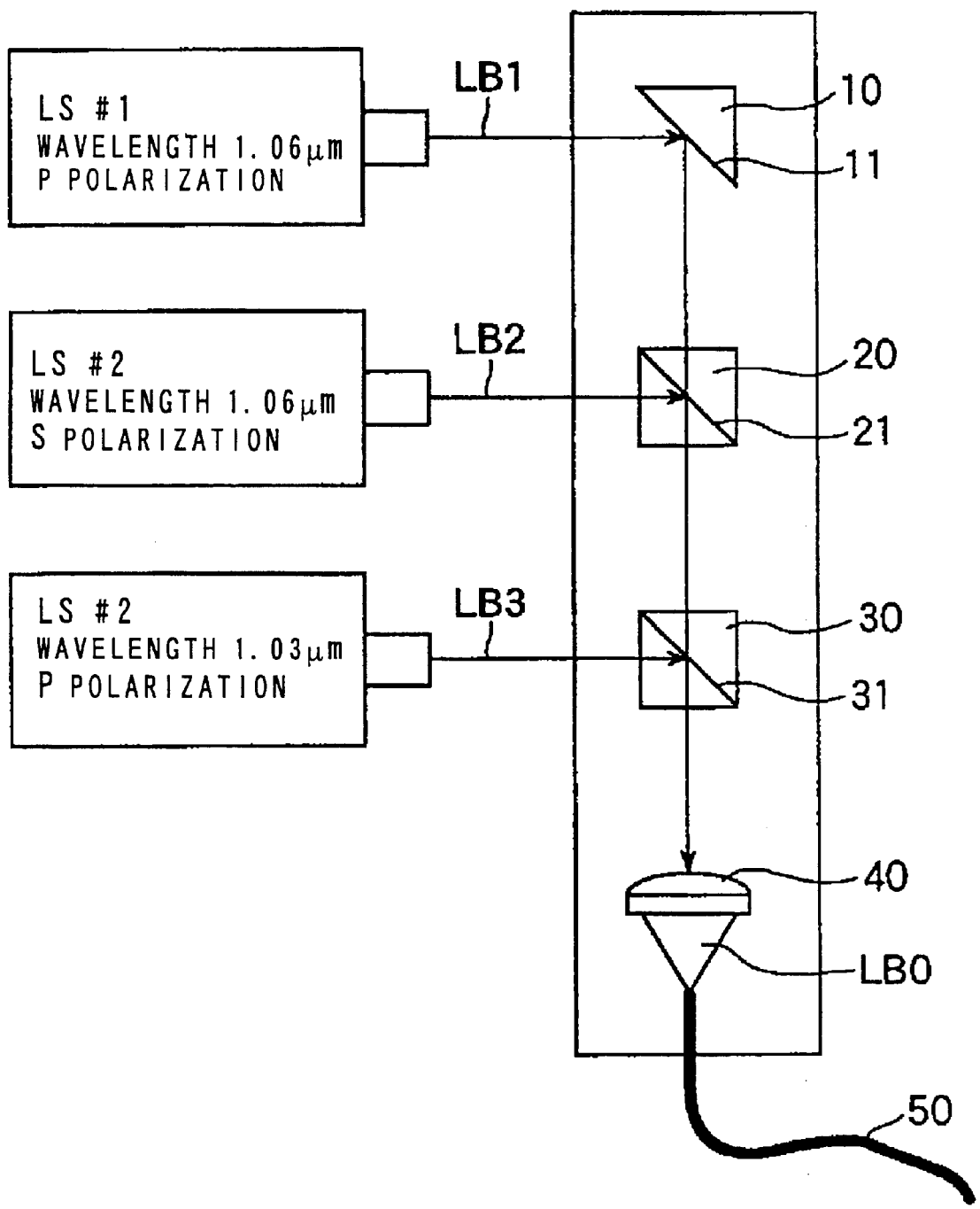
FIG. 3 is a schematic diagram of a laser beam confluence device.

The device with arrangement as shown in FIG. 3 may be used as the laser beam confluence device FC1. In this example, the device is for confluence and transmission of outputs of the three laser generators LS#1 to LS#3 having different characteristics to a single fiber-optic cable 50.

As shown in FIG. 3, the output beams LB1 to LB3 from the laser generators LS#1 to LS#3 have characteristics different form one another. The output laser beam LB1 has an oscillation wavelength of 1.06 $\mu$m and a P polarization, the output laser beam LB2 has an oscillation wavelength of 1.06 $\mu$m and a S polarization, and the output laser beam LB3 has an oscillation wavelength of 1.03 $\mu$m and a P polarization.

In accordance with the characteristics of the laser beams LB1 to LB3, optical elements 10, 20 and 30 are designed in the following manner. The optical element 10 is a reflector having a reflection surface 11 inclined at 45 degree and the reflection surface 11 is a mirror having a high reflectance with respect to the output laser beam LB1 (1.0 $\mu$m: P polarization).

The optical element 20 is formed by combining two triangular prisms with their slant sides joined together, and a multi-layered film 21 having a high transparency with respect to the output laser beam LB1 (1.06 $\mu$m: P polarization) and a high reflectance with respect to the output laser beam LB2 (1.06 $\mu$m: S polarization) is formed at a junction between the two triangular prisms.

The optical element 30 is formed by combining two triangular prisms with their slant sides joined together, and a multi-layered film 31 having a high transparency with respect to the output laser beams LB1 and LB2 (1.06 $\mu$m) and a high reflectance with respect to the output laser beam LB3 (1.03 $\mu$m) is formed at a junction between the two triangular prisms.

The laser beam LB1 outputted from the laser generator LS#1 is reflected by the reflection surface 11 of the optical element 10 and impinges on the multi-layered film 21 of the optical element 20 from a rear side thereof. The laser beam permeated through the film 21 impinges on the multi-layered film 31 of the optical element 31 from a rear side thereof, and the laser beam permeated through the film 31 is focused by a condenser lens 40 and impinges on an end of the fiber-optic cable 50 arranged at an output side of the lens 40.

The laser beam LB2 outputted from the laser generator LS#2 impinges on the multi-layered film 21 of the optical element 20 from a front side thereof. The laser beam reflected by the film 21 impinges on the multi-layered film 31 of the optical element 31 from the rear side, and the laser beam permeated through the film 31 is focused by the condenser lens 40 and impinges on the end of the fiber-optic cable 50.

Further, the laser beam LB3 outputted from the laser generator LS#3 impinges on the multi-layered film 31 of the optical element 30 from a front side thereof. The laser beam reflected by the film 31 is focused by the condenser lens 40 and impinges on the end of the fiber-optic cable 50.

In the case where the number of laser generators increase to four, five, . . . , optical elements similar to the optical elements 20 and 30 are added to make the laser beams confluent to impinge on the single fiber-optic cable. A part of the laser beam is lost at reflection/permeation in the optical elements 10–30.

Thus, the output laser beams LB1 to LB3 from the plurality of laser generators LS#1 to LS#3 are blended to impinge on the end of the fiber-optic cable 50. A ratio of blending the laser beams and a level of sum of laser outputs are changeable by adjusting the output level of the respective laser generators LS#1 to LS#3. For example, in accordance with a kind of a workpiece (a kind of motor vehicle), laser beams with their characteristics appropriately adjusted are supplied by changing the output levels of the respective laser generators.

Figure 4:
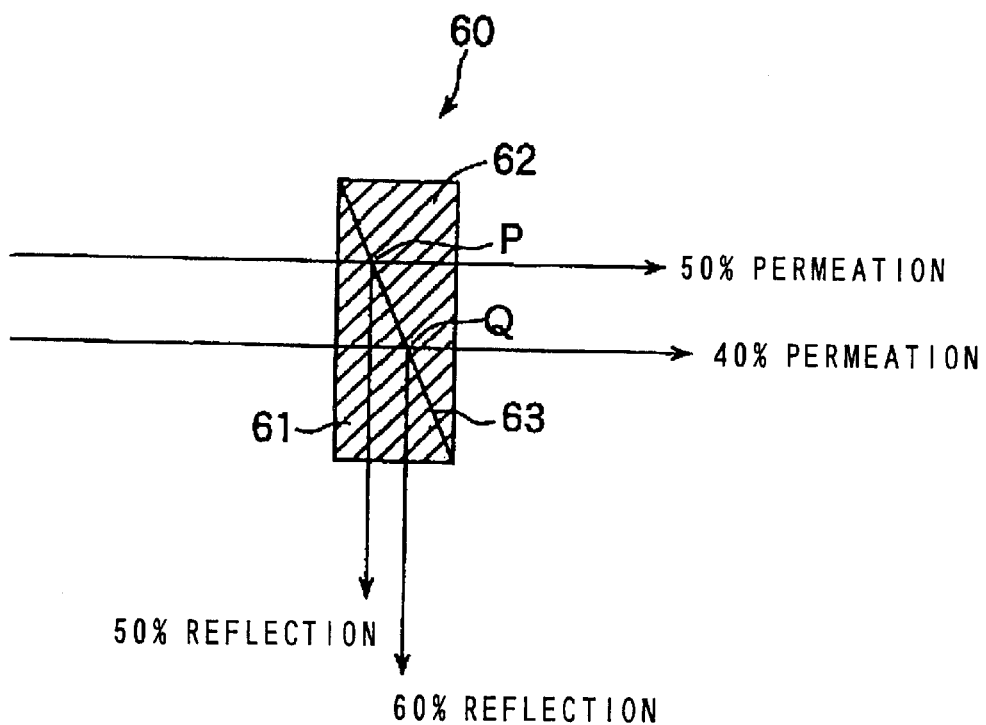
FIG. 4 is a schematic view of an optical element for use in adjusting distribution ratio of a laser beam to a branch optic-cable.
Figure 5:
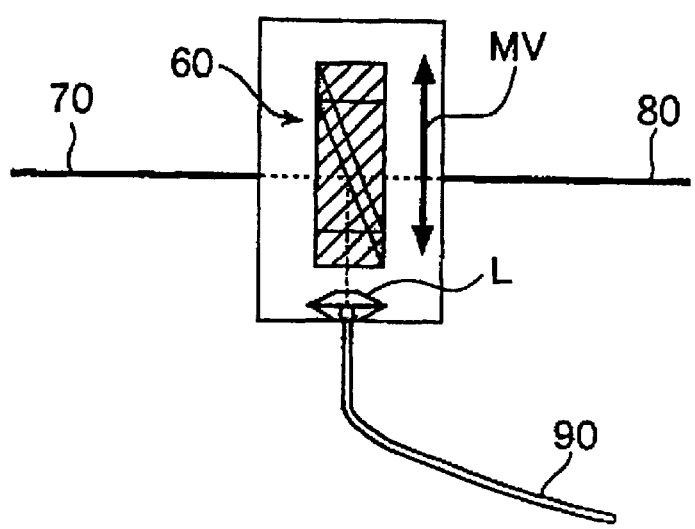
FIG. 5 is a schematic view of an adjustable beam splitter using the optical element as shown in FIG. 4.

Distribution of the laser beams to the branch fiber-optic cables at the laser beam outlet is described referring to FIGS. 4 and 5. FIG. 4 shows an optical element 60 for use in adjusting distribution ratio of the laser beams to the branch fiber-optic cables.

The optical element 60 is a kind of beam splitter and is formed by combining two triangular prisms 61 and 62 with their slant sides joined together, and a transparence/reflection film 63 is formed to permeate parts of the laser beams LB1 to LB3 and reflect the rest of the laser beams. The film 63 is formed so that the transparency/reflectance varies continuously or stepwise. The transparency gradually decreases and the reflectance gradually increases from the upper side to the lower side in FIG. 4. In the shown example, the transparency is 50% and the reflectance is 50% at a point P and the transparency is 40% and the reflectance is 60% at a point Q.

An adjustable beam splitter with transparency/reflectance variable (controllable) is formed by arranging the optical element 60 movable. FIG. 5 shows such an adjustable beam splitter. As shown in FIG. 5, the optical element 60 as shown in FIG. 4 is supported by an appropriate movable mechanism driven by an electric motor, and output beam from the fiber-optic cable 70 on the upstream side impinged on one side of the optical element 60. The output beam from the fiber-optic cable 70 is split and distributed into a fiber optic cable 80 arranged on the downstream side and a fiber-optic cable 90 arranged on a side of the optical element 60.

With the above principle, the distribution ratio of the laser beam into the fiber-optic cables 70 and 80 is controlled within a predetermined range by adjusting the position of the optical element 60 in the direction of an arrow MV. For example, if the arrangement shown in FIG. 5 is adopted at the laser beam outlet OP1 to OP7 in FIGS. 1 and 2, the fiber-optic cable F1 corresponds to the fiber-optic cables 70 and 80, and the fiber-optic cable 90 corresponds to the branch fiber-optic cable FF1 to FF8. In general, the position of the optical element 60 is adjusted so that a relatively high transparency is obtained at the upstream laser outlets and a relatively low transparency is obtained at the downstream laser outlets.

Since a permeated beam is not necessary for the most downstream laser outlet OP8, the optical element 10 having only a high reflectance surface as shown in FIG. 3 may be used.

Since the most upstream laser beam outlet OP1 as shown in FIG. 2 functions as the laser beam confluence device, the fiber-optic cable 70 functions as a fiber-optic cable for receiving confluent laser beam from the fiber-optic cables H1 and H2 (corresponding to the fiber-optic cable 50 in FIG. 3). Thus, the fiber-optic cable 80 corresponds to the fiber-optic cable H3 and the fiber-optic cable 90 corresponds to the branch fiber-optic cable HH1.

Figure 6:
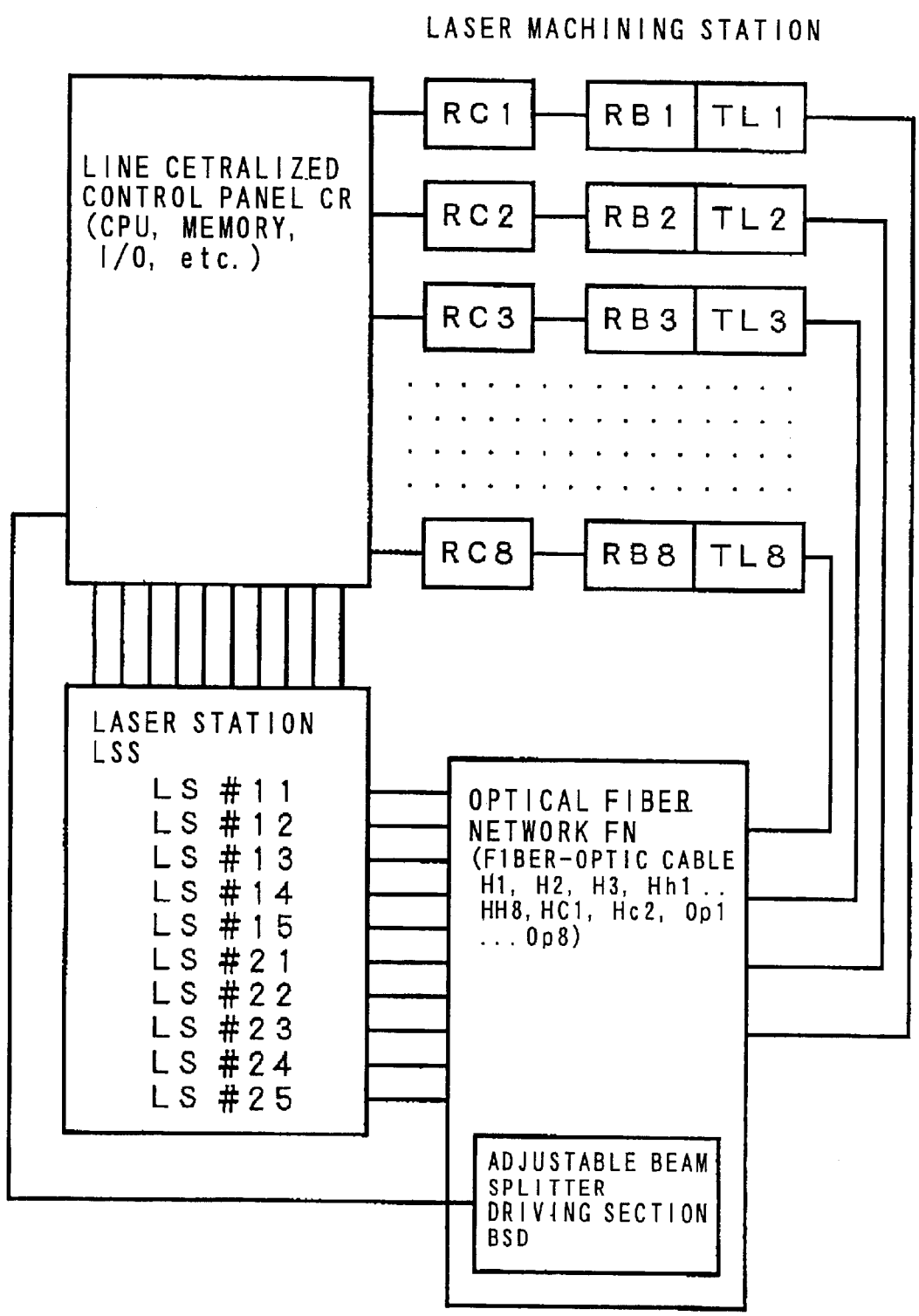
FIG. 6 is a block diagram of a general configuration of the laser machining system.
Figure 7:
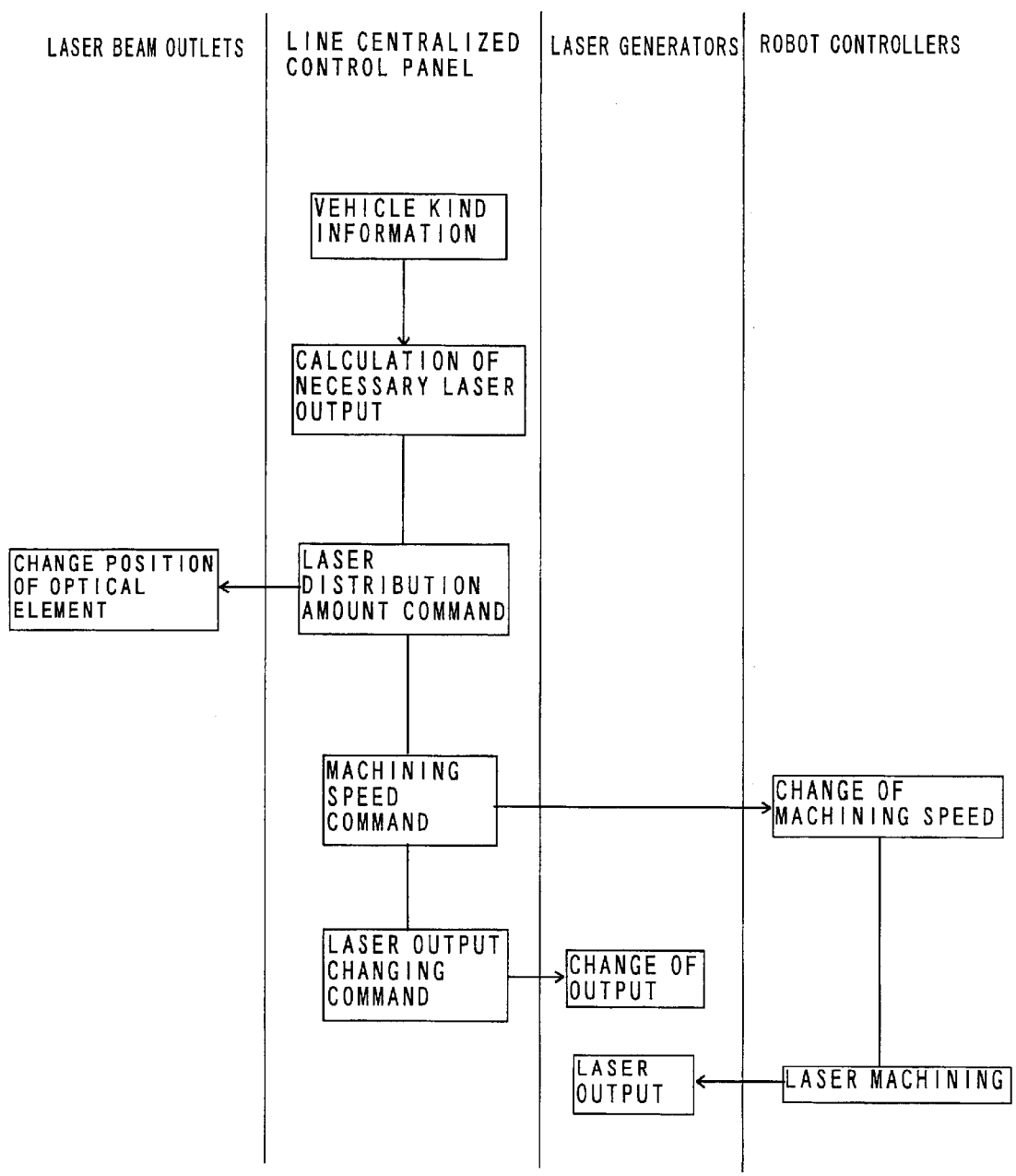
FIG. 7 is a block diagram showing a processing flow for the laser machining.

Control of the output level of the laser generators and the position of the optical element 60 (transparency/reflectance) is performed based on commands from a manufacturing line control panel. System configuration including the line centralized control panel is shown in FIG. 6, and a processing flow is shown in FIG. 7. Principal parts of the system for the arrangement shown in FIG. 2 will be described, however, the system configuration can be modified to be suitable for the arrangement shown in FIG. 1.

In FIG. 6, the line centralized control panel CR comprises a CPU, a memory, an input/output device I/O, etc. The memory stores program data for executing the control (adjustment of the output level of the laser generators and/or adjustment of the adjustable beam splitter) according to the processing flow shown in FIG. 7. The line centralized control panel CR is connected with the robot controllers RC1 to RC 8 for respectively controlling the robots RB1 to RB 8. To each of the robot controllers RC1 to RC4 is taught machining program data including commands for specifying a start/stop and a speed of a machining operation, a type of machining operation (welding or cutting), a changeover thereof and related parameters while the machining tool TL1 to TL4 is moved along a predetermined path. Each machining program is activated by a command sent from the line centralized control panel CR.

The line centralized control panel CR is further connected with respective laser generators LS#11 to LS#25 in the laser station LSS. The output levels of the laser generators LS#11 to LS#25 can be respectively adjusted by commands form the line centralized control panel CR.

The output beams from the laser generators LS#11 to LS#25 in the laser station LSS are distributed and provided to the respective machining tools TL 1 to TL 8 by the optical fiber network FN having the arrangement and the function as described. The optical fiber network FN includes a driving section BSD for driving the adjustable beam splitters 60 to adjust the transparency/reflectance thereof, which is connected with the line centralized control panel CR to receive commands therefrom.

The block diagram of FIG. 7 shows a flow of the control in executing a machining operation. The line centralized control panel CR obtains information on a type of workpiece (a type of motor vehicle) and starts machining programs taught to the robot controllers RC1 to RC 8. The workpiece-type information is transmitted to the line centralized control panel CR from a host computer, for example. The line centralized control panel CR calculates the laser outputs of the respective, laser generators in accordance with the sum of laser beam outputs required by the respective machining tools based on the workpiece-type information. If the calculated laser outputs are different from the presently set values for respective laser generators, a laser output value changing command is issued to the laser generator to change the output value (level) of the laser generator.

The line centralized control panel CR issues a command designating a distribution amount of the laser beam to the laser beam outlet, to the driving section BSD for adjusting the position of the optical elements 60 (the adjustable beam splitter). The line centralized control panel CR produces machining speed commands and send them to the respective robot controllers RC1 to RC8 to change the machining speed (robot motion speed) in accordance with the laser beam output distributed to the laser beam outlet.

In the foregoing embodiments, the output beams from all of the laser generators (FIG. 1) or all of the laser generators in each group (FIG. 2) are joined together to be confluent into the single fiber-optic cable. These arrangements are shown as examples and do not restrict the present invention. In general, the output beams from the laser generators are joined together to be confluent into a fiber-optic cable or fiber-optic cables of the number smaller than that of the laser generators, to simplify the optical transmission network.

Figure 8:
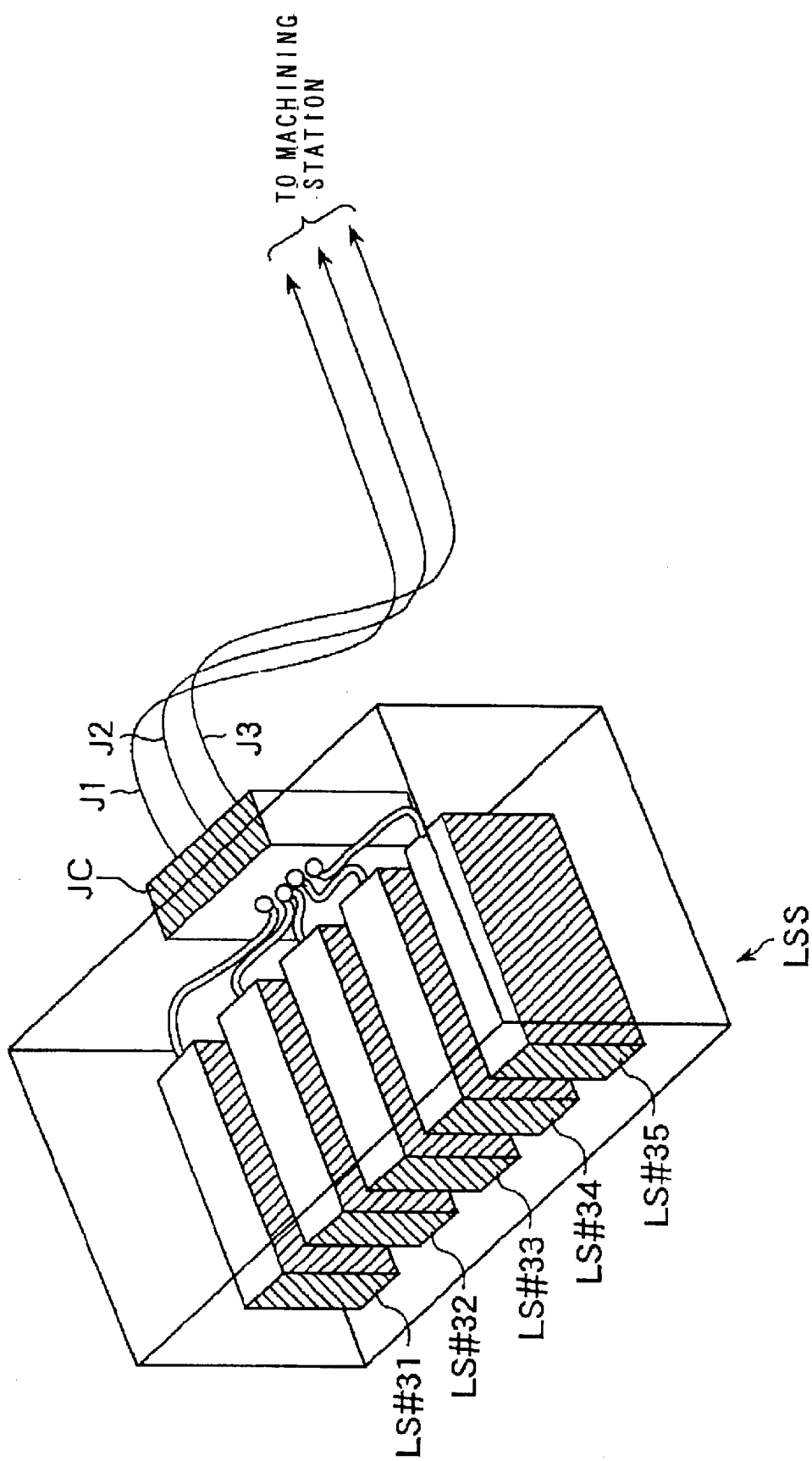
FIG. 8 is a schematic perspective view showing an example of transmitting laser beams outputted from generators to fiber-optic cables of smaller number than that of the laser generators.

FIG. 8 exemplify such arrangement in which the output beams from five laser generators are transmitted to three fiber-optic cables. As shown in FIG. 8, five laser generators LS#31 to LS#35 are arranged at the laser station LSS and output beams are respectively guided to a laser beam confluence device JC by short fiber-optic cables. Three fiber-optic cables J1 to J3 are connected to the laser beam confluence device JC and the output beams from the laser generators LS#31 to LS#35 are aggregated and transmitted to the machining station.

Which output beams from the laser generators LS#31 to LS#35 are joined together to be confluent to which fiber-optic cable J1 to J3 is selected in designing the system.

For example, using the laser beam confluence device as shown in FIG. 3, the output beams from the laser generators LS#31 to LS#33 are joined together to be confluent into the fiber-optic cable J1 and the output beams from the laser generators LS#34 and LS#35 are not joined together to be transmitted to the fiber-optic cables J2 and J3, respectively.

Alternatively, the output beams from the laser generators LS#31 and LS#32 are joined together to be confluent into the fiber-optic cable J1, the output beams from the laser generators LS#33 and LS#34 are joined together to be confluent into the fiber-optic cable J2, and the output beam from the laser generator LS#35 is not joined together to be transmitted to the fiber-optic cable J3.

The machining station is not shown in FIG. 8 since the arrangement thereof is the same as shown in FIG. 1, except that the fiber-optic cables J1 to J3 are used to share the machining tools, e.g., the fiber-optic cable J1 provides the laser outlets OP1 to OP3, the fiber-optic cable J2 provides the laser outlets OP4 to OP6, and the fiber-optic cable J3 provides the laser outlets OP7 and OP8 to constitute the laser beam transmission network in the case of the laser machining apparatus having eight the laser outlets as shown in FIG. 1.

In general, the number of bus fiber-optic cables and the arrangement of the laser outlets are designed and determined in view of factors of output powers of the laser generators, thermal transmission capacities of the fiber-optic cables (maximum transmission amount without problems of damage, deformation, etc.), optical amount necessary for respective machining tools (intensities of the laser beams for respective welding portions), etc. In any design, the output beams from the laser generators are joined together to be confluent into a fiber-optic cable or fiber-optic cables of the number smaller than that of the laser generators. The aggregated laser beam is delivered from the laser outlets to the machining tools for the laser machining.

According to the present invention, the laser beam transmission from a plurality of laser generators to respective machining tools is achieved by a simple optical fiber network. By combination of the confluence and the distribution of the laser beams, an optical transmission network capable of adjusting the output levels of the laser generators and the distribution ratio of the laser beams is easily constituted.

What is claimed is:

1. A laser machining apparatus comprising:
    a plurality of laser generators generating laser beams;
    a plurality of machining tools to focus laser beams;
    machining tool moving means for respectively moving said machining tools along predetermined paths;
    fiber-optic cables forming optical transmission paths to guide the laser beams outputted from said laser generators to the machining tools;
    laser beam confluence means intervened in the optical transmission paths for joining at least part of the laser beams outputted from the laser generators to be confluent into a fiber-optic cable or fiber-optic cables of a number smaller than that of the number of laser generators; and
    laser beam distribution means intervened in the optical paths for distributing the confluent laser beams to a plurality of laser beam outlets, the laser beams distributed to the laser beam outlets to be focused at the machining tools to perform machining.

2. A laser machining apparatus according to claim 1, wherein said plurality of laser generators are divided into a plurality of groups, and at least part of the laser beams outputted from the laser generators in each group are joined to be confluent into a fiber-optic cable or fiber-optic cables of the number smaller than that of the laser generators in the group by said laser beam confluence means and the confluent laser beam in each group is distributed to the plurality of laser beam outlets by said laser beam distribution means.

3. A laser machining apparatus comprising:
    a plurality of laser generators;
    a plurality of machining tools to focus laser beams;
    machining tool moving means for respectively moving said machining tools along predetermined paths;
    fiber-optic cables forming optical transmission paths to guide the laser beams outputted from said laser generators to the machining tools;
    laser beam confluence means intervened in the optical transmission paths for joining at least part of the laser beams outputted from the laser generators to be confluent into a fiber-optic cable or fiber-optic cables of a number smaller than that of the number of laser generators; and
    laser beam distribution means intervened in the optical paths for distributing the confluent laser beams to a plurality of laser beam outlets, the laser beams distributed to the laser beam outlets to be focused at the machining tools to perform machining,
    wherein said laser beam confluent means includes a laser beam superposing optical element to join the laser beams utilizing at least one of a difference of polarizing directions and a difference of wavelengths of the laser beams.

4. A laser machining apparatus according to claim 1, wherein output levels of the respective laser generators are adjusted in accordance with the sum of laser beam outputs required by the respective machining tools.

5. A laser machining apparatus according to claim 1, wherein said machining tool moving means varies a speed of the laser machining in accordance with the laser beam outputs distributed to the laser beam outlets.

6. A laser machining apparatus comprising:
   a plurality of laser generators, each laser generator having optical-fibers extending therefrom to transmit laser beams;
   a confluence unit to join the laser beams transmitted through the optical fibers;
   a plurality of movable machining tools to output laser beams; and
   a common fiber-optic cable optically coupled from the confluence unit to the machining tools such that each laser beam is distributed to a machining tool to output at least one of the laser beams.

7. A laser machining apparatus comprising:
   a plurality of laser generators generating laser beams;
   a plurality of machining tools focusing laser beams;
   machining tool moving units respectively moving said machining tools along predetermined paths;
   fiber-optic cables forming optical transmission paths to guide the laser beams outputted from said laser generators to the machining tools;
   laser beam confluence unit intervened in the optical transmission paths to join at least part of the laser beams outputted from the laser generators to be confluent into a fiber-optic cable or fiber-optic cables of a number smaller than that of the number of laser generators; and
   laser beam distribution units intervened in the optical paths to distribute the confluent laser beams to a plurality of laser beam outlets, the laser beams distributed to the laser beam outlets to be focused at the machining tools to perform machining.

* * * * *